United States Patent Office 3,711,521
Patented Jan. 16, 1973

3,711,521
17α-HYDROXY AND ACYLOXY SUBSTITUTED-9α-METHYL-19-NORPROGESTERONES
Robert V. Coombs, Summit, and Eugene E. Galantay, Morristown, N.J., assignors to Sandoz-Wander, Inc., Hanover, N.J.
No Drawing. Filed Aug. 10, 1970, Ser. No. 62,663
Int. Cl. C07c 169/32
U.S. Cl. 260—397.3                        5 Claims

ABSTRACT OF THE DISCLOSURE

17α - substituted - 9α-methyl-19-norprogesterones, e.g., 17α - acetoxy-9α-methyl-19-norpregn-4-en-3,20-dione, are prepared from 3-alkoxy-17-ethylidene-9α-methylestra-1,3,5(10)-trienes and are useful as progestational agents.

This invention relates to 9α-methyl-19-norprogesterones. More particularly, it relates to 17α-substituted-9α-methyl-19-norprogesterones and processes for their preparation. It further relates to intermediates used in these processes and to processes for preparing the intermediates. This invention also relates to pharmaceutical compositions containing 17α-substituted-9α-methyl-19-norprogesterones and to the use of these compositions as fertility control agents.

The compounds of this invention may be represented by the following formula:

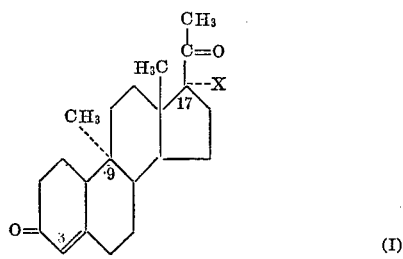

(I)

where X is hydroxyl or

and R is alkyl, i.e., straight or branched chained alkyl having 1 to 19 carbon atoms, e.g., acetoxy, stearoyloxy, and the like.

The compounds of Formula I in which X is acyloxy are prepared in accordance with the following reaction scheme:

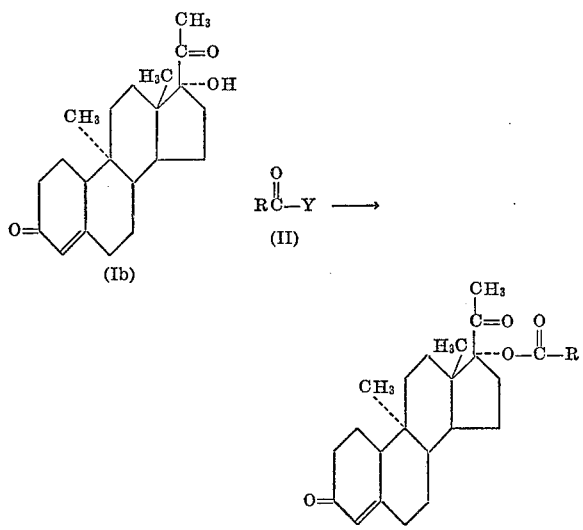

where
R represent alkyl, i.e., straight or branched chain lower alkyl having 1 to 19 carbon atoms, e.g., methyl, ethyl, and the like and
Y represents

as set out above or halo having an atomic weight of from about 35 to 80.

The compounds of Formula Ia are prepared by treating the compounds of Formula Ib with an acylating agent of Formula II. Suitable acylating agents include acids

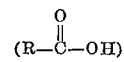

acyl halides and acid anhydrides of formulae acyl-Hal and (acyl)₂O, respectively, wherein acyl is as defined above for

and Hal signifies bromine or chlorine, and mixtures thereof. Where the desired acyl moiety is acetyl, the preferred acylating agent is acetic anhydride. Although a solvent is not necessary, inert solvents, e.g., benzene, may be employed or preferably excess acylating agent may serve as the solvent. An acid-binding agent, e.g., pyridine, may also be used to remove acid liberated in the reaction. The temperature at which the reaction is carried out is not critical but the preferred temperatures may vary between about −10° to +50° C. For optimum results, more stringent conditions may be used, characterized by the presence of a strongly acidic catalyst, e.g., p-toluenesulphonic acid, perchloric acid and the like. With acids

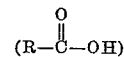

trifluoroacetic anhydride is the preferred catalyst. The product is recovered by conventional techniques, e.g., evaporation.

The compounds of Formula Ib are novel and represent another aspect of this invention. The compound is prepared in accordance with the following reaction scheme:

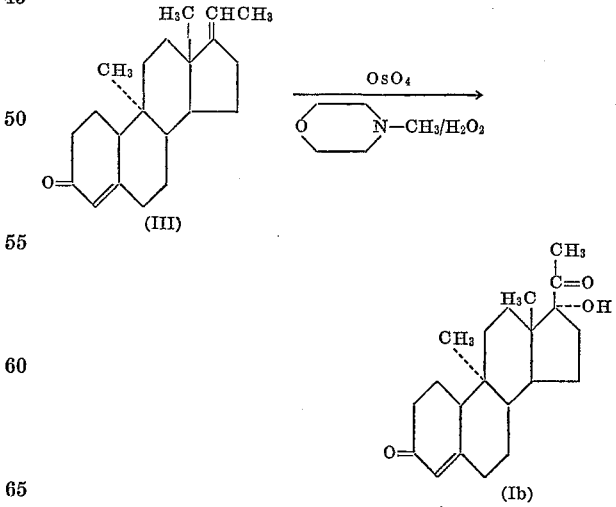

The compound of Formula Ib is prepared by treating the compound of Formula III with N-methylmorpholine oxide peroxide and osmium tetroxide. Although the use of a solvent is not critical, it is preferred that the reaction be run in an inert solvent, preferably lower alkanol or halogenated lower alkanes especially tert-butyl alcohol or methylene dichloride. The temperature at which the reaction is carried out is not critical, but it is preferred that moderate temperatures, e.g. 20° to 40° C., be employed. For optimum results, it is preferred that a small amount of pyridine be included as a catalyst. The product is recovered by conventional techniques, e.g., evaporation and recrystallization.

The compounds of Formula Ib can alternatively be prepared in accordance with the following procedure in which only the D ring of the steroid is shown.

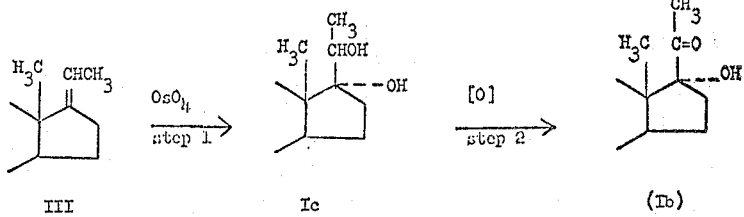

The compound of Formula Ic is prepared by treating the compound of Formula III with osmium tetroxide in an inert solvent. The preferred inert solvents are pyridine, the lower alkanols or the halogenated lower alkanes especially pyridine. The temperature at which the reaction is carried out is not critical, but it is preferred that moderate temperatures, e.g., 20° to 40° C., be employed. For optimum results, it is preferred that a small amount of pyridine be included as a catalyst. The product is recovered by conventional techniques, e.g., extraction and recrystallization.

The compound of Formula Ib is prepared by oxidizing the compound of Formula Ic employing conventional methods for the oxidation of a secondary alcohol to a ketone. For example, the compound of Formula IV may be treated with silver carbonate in an inert organic solvent such as benzene, for example, at reflux temperature. Alternatively, the oxidation may conveniently be effected with chromium trioxide in an inert organic solvent such as pyridine, acetone or dimethylformamide and at a temperature of from 0° to 30° C. The oxidation employing chromium trioxide may optionally be carried out in the presence of an acid, for example, a mineral acid such as sulphuric acid, or an organic acid such as acetic acid, which organic acid, if suitable under the reaction conditions, may serve as solvent. The product is recovered by conventional methods, e.g., extraction and evaporation.

The compound of Formula III is novel and represents a further aspect of this invention. The compound is prepared in accordance with the following reaction scheme:

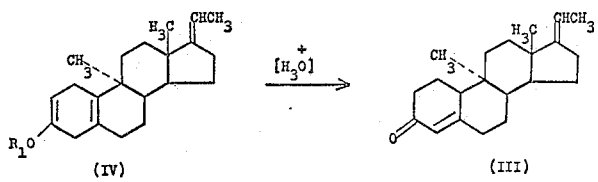

where $R_1$ represents alkyl having 1 to 4 carbon atoms.

The compounds of Formula III are prepared by the acid cleavage-rearrangement of compounds of Formula IV, under vigorous acidic conditions. The vigorous acidic conditions may consist in carrying out the reaction either in a strongly acidic aqueous medium, i.e., at a pH value of less than 3 and preferably from 1 to 2 or alternatively, under milder acidic conditions, for example, at a pH value of from 3 to 4, over a relatively prolonged period, for example, in excess of 3 hours. Conventional water soluble inorganic or organic acids, e.g., sulphuric acid, p-toluene sulfonic acid, hydrochloric acid or oxalic acid may be used to provide the strongly acidic conditions; and water soluble organic acid, e.g., oxalic acid or acetic acid, may be used to provide the milder acidic conditions. The particular acid used in the reaction is not critical.

The process may be carried out at temperatures of

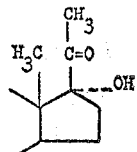

from, for example 0° to 100° C., preferably from 20° to 70° C. An inert water-miscible organic co-solvent, preferably a lower alcohol such as methanol may be used where desired and where a water-soluble organic acid, suitable as a solvent under the reaction conditions, is employed, the reaction may be carried out in an excess thereof. Neither the temperature nor the particular co-solvent used is critical.

The compounds of Formula IV are novel and represent a further aspect of this invention. The compounds are prepared in accordance with the following reaction scheme:

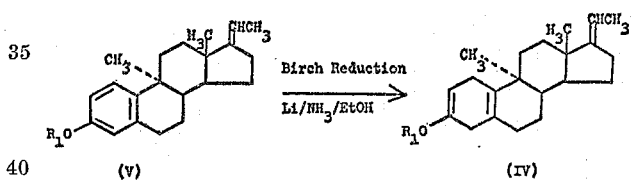

where $R_1$ is as defined above.

The compounds of Formula IV are prepared by the Birch reduction of the compounds of Formula V. The Birch reduction is carried out using alkaline metal, e.g., lithium, sodium or potassium in liquid ammonia, in the presence of a proton donor. The ammonia serves as the reaction medium; but if desired, inert organic solvent may be included in the reaction mixture, e.g., an ether, such as tetrahydrofuran. The temperature and pressure are controlled so as to maintain the ammonia in liquid state. The reaction is preferably carried out under atmospheric pressure at temperatures of from about −70° to −30° C. and preferably at the reflux temperature of ammonia (under one atmosphere). Suitable proton donors include lower alkanols, e.g., t-butanol and ethanol. The product is recovered by conventional techniques, e.g., evaporation.

The compounds of Formula V are prepared in accordance with the following reaction scheme:

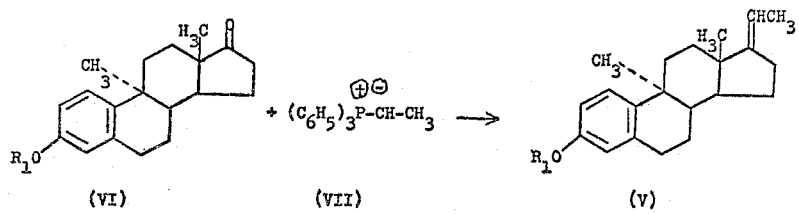

where $R_1$ is as defined above.

The compounds of Formula V obtained by "ethylidenating" the compounds of the Formula VI with the "Wittig" reagent, (VII), triphenylethyl-phosphonium ylide. The Wittig reagent is prepared in situ by treating a triphenylethyl-phosphonium halide with a strong base, e.g., sodium methylsulfinylmethide prepared by reacting dimethyl sulfoxide with sodium hydride. It is preferred that excess dimethyl sulfoxide be used as the reaction medium in the procedure. The reaction temperature is not critical, but it is preferred that temperatures between about 50° to 120° C., preferably 60° to 100° C., be employed. For optimum results, the reaction is carried out over periods in excess of 15 hours. The product is recovered by conventional techniques, e.g., extraction and evaporation.

The compounds of Formula VI are prepared by cleaving the 17-ketal linkage of a compound of Formula VIII

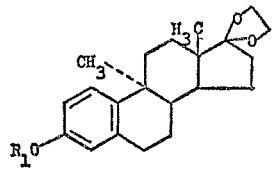

where $R_1$ has the significance indicated above .

The cleavage may be carried out in conventional manner for cleaving a ketal linkage. For example, the compound of Formula VIII may be treated with a water soluble inorganic or organic acid under the vigorous acidic conditions described above in connection with the preparation of the compounds of Formula III.

The compound of Formula VIII may be prepared by reducing the 11-carbonyl function of a compound of Formula IX:

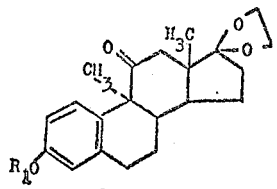

where $R_1$ is a defined above.

The reduction may be effected in a manner conventional for the reduction of a carbonyl function to a methylene unit, for example, by a Wolff-Kishner reduction method involving the initial formation of the hydrazone derivative by heating a compound of Formula IX, e.g., at a temperature of about 130° C., with hydrazine or a mixture of hydrazine dihydrochloride and hydrazine hydrate in a water-miscible solvent having a boiling point of at least about 210° C., such as di- or triethyleneglycol. The hydrazone may then be decomposed, for example, by continued reflux and the removal of water by distillation in the presence of an alkali metal hydroxide, e.g., potassium hydroxide or sodium hydroxide, to yield the compound of Formula IX.

The compounds of Formula IX may be prepared by reaction a compound of Formula X:

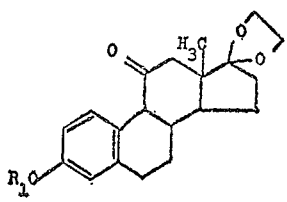

where $R_1$ is as defined above.
with a compound of Formula XI, $$CH_3—Z \qquad (XX)$$

in which Z is the acid residue, other than a fluorine atom, of a mineral acid or of an organic sulphonic acid, in the presence of a strong base.

Examples of compounds of Formula XI include methyl chloride, methyl bromide, methyl iodide, methyl aryl sulphonates, e.g. methyl p-toluene sulphonate, and methyl alkyl sulphonaes, e.g. methyl methane sulphonate.

Suitable strong bases include compounds of Formula XIII, $$M—A \qquad (XII)$$

in which

M signifies an alkali metal atom, e.g. sodium or potassium, and

A signifies a hydrogen atom, an alkoxy group of 1 to 6 carbon atoms, or an $—NH_2$ or $—CH_2—SO_2—CH_3$ group.

The reaction is conveniently performed under an inert atmosphere, e.g. of nitrogen. Suitably reaction temperatures vary from —10° to +60° C., although preferably the reaction medium is ice-cooled in the initial stages of the reaction, thereafter the temperature being allowed to rise, for example to room temperature. The reaction is suitably performed in an inert organic solvent, e.g. t-butanol or dimethyl sulphoxide. Alternatively, where the compound of Formula XI is liquid under the reaction conditions, an excess, e.g. a 10 to 200 mold excess of such compound, may be employed to provide the reaction medium. The preferred compound of Formula XI is methyl iodide, and the preferred compound of Formula XII is potassium tertiary butoxide.

The compounds of Formulae XI and XII are known or may be produced in conventional manner from available starting materials.

The compounds of Formula X may be produced by oxidising the 11-hydroxy function of a compound of Formula XIII,

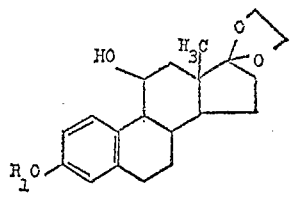

where $R_1$ is as defined above.

The oxidation may be carried out in conventional manner for the oxidation of a secondary alkyl hydroxy function to a carbonyl function. Conveniently it is carried out employing the method of Pfitzner and Moffat, J. Am. Chem. Soc. 87, 5661 and 5670 (1965), involving the use of dimethyl sulphoxide, dicyclohexylcarbodiimide and a proton source such as anhydrous phosphoric acid or dichloroacetic acid. The reaction is suitably carried out in an inert organic solvent, e.g. an aromatic hydrocarbon such as benzene. The reaction may, for example, be performed at a temperature of from 15° to 35° C., preferably from 20° to 30° C. Alternatively the oxidation may be performed using Jones reagent (J. Chem. Soc. 1946, 39, and Reagents for Organic Synthesis, Fieser and Fieser, p. 142).

The compounds of Formula XIII may be obtained by etherification of the phenolic hydroxy function of a compound of Formula XIV

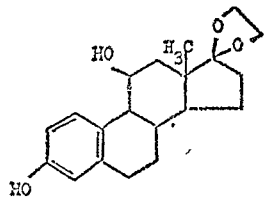

The process may be effected in manner conventional for the etherification of a phenolic hydroxy function. Thus the alkylating agent may, for example, be an alkyl iodide having from 1 to 4 carbon atoms. The process is conveniently carried out under basic conditions, provided, for example, by the presence of anhydrous potassium carbonate. Suitably, the process is carried out in an inert organic solvent, for example, a lower alcohol such as methanol. The reaction temperature may, for example be from 60° to 100° C., although preferably the reaction is performed at the reflux temperature of the reaction medium. When an alcohol is used as solvent, it is preferred that the alkyl moieties of the alcohol and the alkylating agent be the same.

The compounds of Formulas II, VII and XIV are known or may be prepared from known starting materials in conventional manner.

The compounds of Formula I are useful because they possess pharmacological properties in animals. In particular, such compounds are useful as fertility control agents in animals as they exhibit progestational activity. The progestational activity is indicated by the well known Clauberg test; the method basically described in Endocrinology 63 (1958), 464 wherein a rabbit is given 0.01 to 1.0 milligrams of active agent.

These compounds may be combined with a pharmaceutically acceptable carrier or adjuvant. They may be administered orally or parenterally. The dosage will vary depending upon the mode of administration utilized and the particular compound employed. However, in general, satisfactory results are obtained in large animals, e.g., primates when the compounds are administered at a daily dosage of from about 0.05 milligram to 50 milligrams. This daily dosage is preferably given in equally divided doses, e.g., 1 to 2 times a day, or in sustained release form. It will be appreciate by those skilled in the art, that the daily dosage level is independent of body weight. Dosage forms suitable for internal administration comprise from about 0.025 mg. to about 50 mg. of the compound in admixture with a solid or liquid pharmaceutical carrier or diluent.

A representative formulation suitable for oral administration is a capsule (250 mg.) prepared by standard techniques which contains the following:

| Ingredient: | Weight (mg.) |
|---|---|
| 17α - acetoxy - 9α - methyl - 19 - norpregn- 4 - en - 3,20 - dione | 0.5 |
| Inert solid diluent (starch, lactose, kaolin) | 249.5 |

The following examples are provided as illustrative of the invention; all temperatures are centigrade and room temperature is 20° to 30° C., unless indicated otherwise.

EXAMPLE 1

17α-acetoxy-9α-methyl-19-norpregn-4-en-3,20-dione

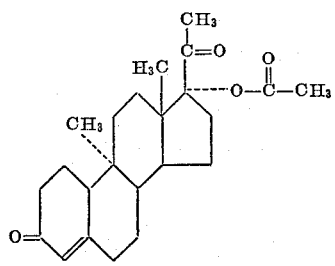

Step A—17-ethylenedioxy - 11β - hydroxy-3-methoxyestra-1,3,5(10)-triene (Compound XIII).—A mixture of 15 g. of 17-ethylenedioxyestra-1,3,5(10)trien - 3,11β-diol and 30 g. of anhydrous potassium carbonate in 75 ml. of methanol and 60 ml. of methyl iodide is stirred and heated under reflux for 3 hours. The mixture is then cooled and diluted by addition of 200 ml. of water. The methanol and methyl iodide are removed by distillation under reduced pressure and the aqueous residue is extracted twice with methylene chloride. The combined organic extracts are washed with saturated sodium chloride solution and dried over sodium sulfate. Removal of the solvent gives a residue which is crystallized from ether to yield 17-ethylenedioxy-11β-hydroxy-3-methoxyestra-1,3,5-(10)-triene, M.P. 125–126° C.

Step B—17-ethylenedioxy - 3 - methoxyestra-1,3,5(10)-triene-11-one (Compound X).—To a stirred solution of 5.13 g. of 17-ethylenedioxy-11β-hydroxy-3-methoxyestra-1,3,5(10)-triene in 25 ml. of dimethylsulfoxide and 25 ml. of benzene is added 3 ml. of pyridine and 9.3 g. of N,N-dicyclohexylcarbodiimide. This mixture is then cooled and 1.5 ml. of dichloroacetic acid is added. The whole is next stirred at room temperature for 1½ hours. It is diluted by the addition of 50 ml. of ether and a solution of 4 g. of oxalic acid in 10 ml. of methanol is added dropwise. The resulting suspension is stirred for 40 minutes at room temperature and then filtered. The filtrate is concentrated to dryness and distributed between methylene chloride and a 10% aqueous solution of sodium bicarbonate. The organic phase is washed with water and dried (Na₂SO₄) before being evaporated to dryness under reduced pressure. The residue is placed on a column of silica-gel and eluted with chloroform containing various percentages of methanol. The fractions eluted with chloroform containing 5% of methanol are combined and evaporated to yield a residue which is crystallized from hexane/ether (1:1). Thus is obtained 17-ethylenedioxy-3-methoxyestra - 1,3,5(10) - trien - 11 - one, M.P. 122–123° C.

Step C—17 - ethylenedioxy - 3 - methoxy - 9α-methylestra - 1,3,5(10) - trien-11-one (Compound IX).—To a stirred, ice cooled solution of 10.5 g. of 17-ethylenedioxy-3-methoxyestra-1,3,5(10)-trien - 11 - one in 300 ml. of methyl iodide under an atmosphere of nitrogen is added, over 10 minutes, 120 ml. of a 1.1 molar solution of potassium tert.-butoxide in t-butyl alcohol. The temperature is allowed to rise to room temperature and the mixture is then stirred for 18 hours. It is next poured onto 500 ml. of water and extracted with methylene chloride, twice. The combined organic extracts are washed with water and dried over sodium sulfate. Removal of the solvent gives an oil which is crystallied from ether to yield 17-ethylenedioxy - 3 - methoxy-9α-methylestra - 1,3,5(10)-trien-11-one, M.P. 142–145° C.

Step D—17 - ethylenedioxy - 3 - methoxy - 9α - methylestra-1,3,5(10)-triene (Compound VIII).—A mixture of 534 mg. of 17-ethylenedioxy-3-methoxy-9α-methylestra-1,3,5(10)trien-11-one, 1 g. of hydrazine dihydrochloride and 5 g. of hydrazine hydrate in 35 g. of triethyleneglycol is heated to a temperature of 130° and maintained there for 2½ hours. After this time, 1.8 g. of potassium hydroxide pellets is added and the temperature raised to 210°. This temperature is also maintained for 2½ hours whilst a mixture of hydrazine and water is slowly allowed to distill out. The reaction mixture is cooled and diluted with water yielding a precipitate which is collected by filtration. The solid is dissolved in methylene chloride and the organic solution is dried over sodium sulfate. Removal of the solvent leaves a residue which is crystallized from hexane-ether to yield 17-ethylenedioxy-3-methoxy-9α-methylestra-1,3,5(10)-triene, M.P. 115° C.

Step E—3-methoxy - 9α - methylestra-1,3,5(10)-trien-17-one (Compound VI).—To a warm solution of 220 mg. of 17-ethylenedioxy - 3 - methoxy - 9α - methylestra-1,3,5 (10)triene in 5 ml. of methanol is added 1 ml. of 2 N hydrochloric acid solution and the mixture is heated under reflux for 5 minutes. On cooling, crystals are precipitated and these are isolated by filtration. The crystalline solid is washed with a small quantity of ether to yield 3-methoxy-9α-methylestra-1,3,5(10)-trien - 17 - one, M.P. 190°–192° C.

Step F—17-ethylidene - 3 - methoxy-9α-methylestra-1, 3,5(10)-triene (Compound V).—To a (25°) solution of sodium methylsulfinylmethide, prepared in the usual way from 2.4 g. of sodium hydride in 45 ml. of dimethyl sulfoxide, there is rapidly added at 25° a solution of 22.4 g. of ethyltriphenylphosphonium iodide in 90 ml. of dimethyl sulfoxide. To the resulting deep red mixture, 4.0 g. of 3-methoxy-9α-methylestra-1,3,5(10)-trien-17-one is added and kept at 60° for 18 hours. After pouring on ice (200 g.) the product is extracted with petroleum ether and purified by filtration of the petroleum ether solution through 13 g. of alumina (Grade I).

Step G—3-methoxy - 17 - ethylidene-9α-methylestra-2, 5-(10)-diene (Compound IV).—A total of 1.5 g. of lithium wire is added in 5 or 6 portions to a solution of 1.0 g. of 3-methoxy-17-ethylidene-9α-methylestra-1,3,5(10)-triene [1] in 80 ml. of anhydrous tetrahydrofuran containing 80 ml. of ammonia which had been introduced by distillation. After the addition is complete, the resulting dark blue solution is vigorously stirred under reflux for 45 minutes. To this is then added 20 ml. of absolute ethanol and stirring is continued until the blue color is discharged (≃15 minutes). Water and ether are then added and the layers are separated. The organic phase is washed twice with brine before being dried over sodium sulfate and concentrated. The residue is crystallized from ether to give 3-methoxy - 17 - ethylidene-9α-methylestra-2,5(10)-diene, M.P. 158°–160°.

Step H—17 - ethylidene 9α - methylestra - 4 - en-3-one (Compound III).—To a solution of 600 mg. of 3-methoxy-17-ethylidene-9α-methylestra-2,5(10)-diene in 20 ml. of acetone is added 8 ml. of 2 N hydrochloric acid solution; and the resulting solution is left at room temperature for 1½ hours. The acetone is removed in vacuo and the aqueous residue is neutralized by the addition of a 10% solution of sodium bicarbonate. The solution is then extracted with methylene chloride and the organic extract is dried over sodium sulfate and concentrated. The residue is crystallized from ether to give 17-ethylidene-9α-methylestra-4-en-3-one, M.P. 134°–135°.

Step I—17α-hydroxy-9α - methyl - 19 - norpregn-4-en-3,20-dione (Compound Ib).—A solution is prepared by dissolving 400 mg. of 17-ethylidene-9α-methylestra-4-en-3-one in a mixture of 2.2 ml. of methylene chloride, 18 ml. of tert-butanol and 0.6 ml. of pyridine. To this is added 3.5 ml. of N-methylmorpholine oxide peroxide solution in tert-butanol followed by 0.15 ml. of a 3% solution of osmium tetroxide solution in tert-butanol. The resulting red/brown solution is stirred at room temperature for 65 hours whereafter 10 ml. of 5% sodium sulfite solution is added. The solvents are removed in vacuo and the residue is shaken with a mixture of brine and methylene chloride. The organic phase is dried over sodium sulfate and concentrated. The residue is crystallized from ether to give 17α-hydroxy - 9α - methyl - 19 - norpregn-4-en-3,20-dione, M.P. 225°–230° (dec.).

Step J—17a-acetoxy - 9α - methyl - 19 - norpregn-4-en-3,20-dione [2] (Compound Ia).—A solution of 200 mg. of 17α-hydroxy - 9α - methyl-19-norpregn-4-en-3,20-dione, in 4 ml. of acetic anhydride containing 60 mg. of p-toluenesulfonic acid is stirred at room temperature for 3½ hours. Water is then added and after stirring for a further 15 minutes, the precipitated product is filtered off and washed with water. This crude material is re-dissolved in 40 ml. of methanol and treated with a solution of 200 mg. of potassium hydroxide in 1 ml. of water and 3 ml. of methanol. After 15 minutes at room temperature, the solution is neutralized by the addition of acetic acid and concentrated in vacuo. The residue is dissolved in a mixture of benzene and water and the organic phase is dried over sodium sulfate and concentrated. The residue is crystallized from ether to give 17α-acetoxy-9α-methyl-19-norpregn-4-en-3,20-dione, M.P. 198°–199°.

---

[1] Pure crystalline material (>95% cis isomer) was used for the series of reactions described below. This gave pure crystalline intermediates. If crude starting material had been used, a pure product would not have been obtained until after Step I, since both cis and trans starting materials in Step G would give the same product after Step I.

[2] Alternate name—17α-acetoxy-17β-acetyl-9α-methylestra-4-en-3-one.

EXAMPLE 2

17α-caproyloxy-9α-methyl-19-norpregn-4-en-3,20-dione

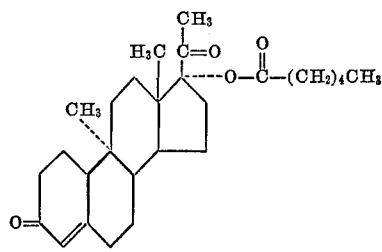

Step A—17α,20-dihydroxy-9α-methyl - 19 - norpregn-4-en-3-one.—To a solution of 400 mg. of 17-ethylidene-9α-methylestra-4-en-3-one prepared as described in Steps A through H of Example 1, in 10 ml. of pyridine is added a solution of 350 mg. of osmium tetroxide in 10 ml. of pyridine. The mixture is left at room temperature for 18 hours after which is added with stirring a solution of 600 mg. of sodium bisulfite in 20 ml. of water and 15 ml. of pyridine. After stirring for 15 minutes, the solution is extracted twice with chloroform and dried over sodium sulfate. The solvent is evaporated and after trituration of the residue with ether/hexane (1/1), there is obtained the product, 17α,20-dihydroxy-9α-methyl-19-norpregn-4-en-3-one.

Step B—17α-hydroxy - 9α - methyl - 19 - norpregn-4-en-3,20-dione.—To a solution of 400 mg. of the diol obtained from Step A in 10 ml. of dimethylformamide, there is added 400 mg. of chromium trioxide under cooling, followed by 10 ml. of dimethylformamide containing 0.5 ml. of concentrated sulfuric acid. The resulting darkened mixture is allowed to stand at room temperature for 2 hours after which it is shaken out with a water/ether mixture (1/1). The ether phase is separated and washed with saturated sodium bicarbonate solution. After drying over sodium sulfate and evaporating off the solvent, there is obtained a residue which is crystallized from ether to give 17α-hydroxy-9α-methyl-19-norpregn-4-en-3,20-dione.

Step. C—17α-caprolyoxy-9α-methyl-19-norpregn-4-en-3,20-dione.—A solution of 400 mg. of the dione from Step B, above, in 15 ml. of caproic acid is treated with 2 ml. of trifluoroacetic anhydride at room temperature for 17 hours. The reaction mixture is then treated cautiously with 100 ml. of 5% sodium bicarbonate solution and, after CO₂ evolution ceased, the product is extracted with ether. The ether solution is washed twice with cold 2% sodium hydroxide solution and with water and then dried. The crude product is chromatographed on 150 g. of silica gel. Elution with benzeneethyl acetate (9:1) yields 17α-caproyloxy-9α-methyl-19-norpregn-4-en-3,20-dione.

When the process of Step C is carried out using an equivalent amount of stearic acid dissolved in a small amount of benzene in place of the caproic acid used therein, there is obtained 17α-stearoyloxy-9α-methyl-19-norpregn-4-en-3,20-dione.

What is claimed is:
1. A process for preparing a compound of the formula

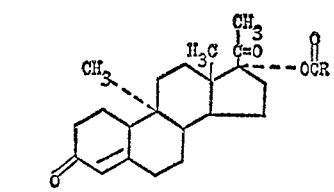

which comprises treating a compound of the formula

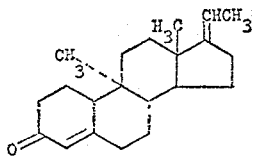

with N-methylmorpholine oxide peroxide and osmium tetroxide to obtain an intermediate of the formula

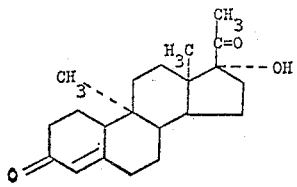

and thereafter treating said intermediate with a compound of the formula

where
Y represents hydrogen,

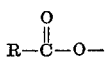

or halo having an atomic weight of about 35 to 80 and
R is alkyl having 1 to 19 carbon atoms.

2. 17-ethylidene-9α-methylestra-4-en-3-one.
3. A compound of the formula

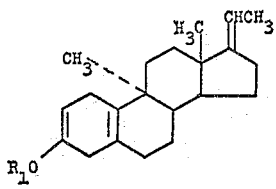

where R₁ is alkyl having 1 to 4 carbon atoms.
4. The compound of claim 3 which is 3-methoxy-17-ethylidene-9α-methylestra-2,5(10)-diene.
5. A process for preparing a compound of the formula

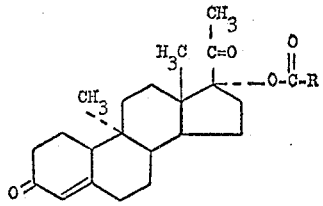

which comprises treating a compound of the formula

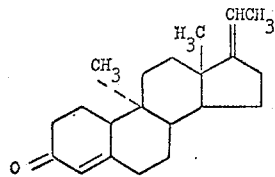

with osmium tetroxide to obtain a first intermediate of the formula

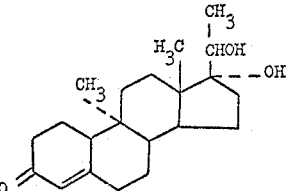

oxidizing said first intermediate to obtain a second intermediate

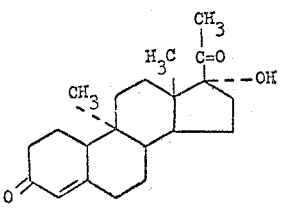

and thereafter treating said second intermediate with a compound of the formula

where Y represents hydrogen,

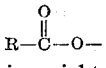

or halo having an atomic weight of about 35 to 80, and R is alkyl having 1 to 19 carbon atoms.

References Cited

UNITED STATES PATENTS 3,053,836    9/1962    Fried _____ 260—239.55

FOREIGN PATENTS 762,308    11/1956    Great Britain _____ 260—397.4

OTHER REFERENCES

Chemical Abstracts (1966), vol. 64, p. 6985(d) relied on.

ELBERT L. ROBERTS, Primary Examiner

U.S. Cl. X.R.

260—397.45, 397.5, 239.55 C; 424—243